(12) United States Patent
Cui et al.

(10) Patent No.: US 9,294,256 B2
(45) Date of Patent: Mar. 22, 2016

(54) METHODS AND DEVICES FOR NOTIFYING AND DETERMINING PATTERNS OF COMMON REFERENCE SIGNALS

(71) Applicant: Sony Corporation, Minato-ku (JP)

(72) Inventors: Qimei Cui, Beijing (CN); Hui Wang, Beijing (CN); Weijuan Gao, Beijing (CN)

(73) Assignee: SONY CORPORATION, Tokyo (JP)

( * ) Notice: Subject to any disclaimer, the term of this patent is extended or adjusted under 35 U.S.C. 154(b) by 142 days.

(21) Appl. No.: 14/163,337

(22) Filed: Jan. 24, 2014

(65) Prior Publication Data

US 2014/0211695 A1    Jul. 31, 2014

(30) Foreign Application Priority Data

Jan. 25, 2013  (CN) .......................... 2013 1 0030512

(51) Int. Cl.
| | |
|---|---|
| H04W 24/02 | (2009.01) |
| H04W 72/04 | (2009.01) |
| H04W 72/08 | (2009.01) |
| H04L 5/00 | (2006.01) |
| H04W 28/06 | (2009.01) |
| H04B 7/02 | (2006.01) |
| H04B 7/06 | (2006.01) |

(52) U.S. Cl.
CPC .......... *H04L 5/0092* (2013.01); *H04L 5/0094* (2013.01); *H04B 7/024* (2013.01); *H04B 7/0626* (2013.01); *H04L 5/005* (2013.01); *H04L 5/0023* (2013.01); *H04L 5/0035* (2013.01); *H04L 5/0044* (2013.01); *H04L 5/0057* (2013.01); *H04W 28/06* (2013.01)

(58) Field of Classification Search
CPC ... H04L 5/0023; H04L 5/0044; H04L 5/0057; H04L 5/0035; H04B 7/024; H04B 7/026; H04B 7/0619; H04B 7/0626; H04B 7/0632; H04B 7/0417; H04B 7/0643; H04W 72/00; H04W 72/02; H04W 72/04; H04W 72/042
See application file for complete search history.

(56) References Cited

U.S. PATENT DOCUMENTS

| | | | | |
|---|---|---|---|---|
| 2010/0238821 | A1* | 9/2010 | Liu | ........................ H04L 43/045 370/252 |
| 2011/0098054 | A1* | 4/2011 | Gorokhov | .............. H04B 7/024 455/452.1 |
| 2012/0176884 | A1* | 7/2012 | Zhang | ..................... H04B 7/024 370/203 |
| 2012/0190356 | A1* | 7/2012 | Zhao | ...................... H04L 5/0035 455/422.1 |
| 2012/0236741 | A1* | 9/2012 | Xu | .......................... H04B 7/024 370/252 |
| 2013/0003788 | A1* | 1/2013 | Marinier et al. | ............... 375/219 |
| 2013/0083780 | A1* | 4/2013 | Luo | .................... H04W 72/0406 370/336 |

(Continued)

*Primary Examiner* — Candal Elpenord
(74) *Attorney, Agent, or Firm* — Oblon, McClelland, Maier & Neustadt, L.L.P.

(57) ABSTRACT

The disclosure relates to methods and devices for notifying and determining common reference signal (CRS) patterns. The notification method comprises the steps of transmitting first downlink control information (DCI) to user equipment (UE) to inform the UE an aperiodic channel status information (CSI) feedback set and a CoMP transmission scheme to be applied to the UE, wherein the CoMP transmission includes a plurality of possible combinations of transmission points that transmit PDSCH to the UE; and transmitting second DCI to the UE for notifying transmission parameter to the UE based on the first DCI. In the disclosure, all CoMP transmission schemes and notifications of all CRS patterns therein can be supported, thus effectively perfecting notifications of the CRS patterns, saving signaling overheads, and significantly improving the flexibility.

15 Claims, 10 Drawing Sheets

(56) References Cited

U.S. PATENT DOCUMENTS

| | | | | |
|---|---|---|---|---|
| 2013/0107832 A1* | 5/2013 | Kim | H04L 5/0057 | 370/329 |
| 2013/0301542 A1* | 11/2013 | Krishnamurthy | H04W 52/50 | 370/329 |
| 2013/0322376 A1* | 12/2013 | Marinier | H04W 72/06 | 370/329 |
| 2014/0010126 A1* | 1/2014 | Sayana | H04J 3/1694 | 370/280 |
| 2014/0044040 A1* | 2/2014 | Chen | H04W 24/02 | 370/328 |
| 2014/0044061 A1* | 2/2014 | Yue | H04W 72/042 | 370/329 |
| 2014/0086173 A1* | 3/2014 | Sadeghi | H04L 5/005 | 370/329 |

* cited by examiner

METHODS AND DEVICES FOR NOTIFYING AND DETERMINING PATTERNS OF COMMON REFERENCE SIGNALS

FIELD OF THE INVENTION

The disclosure relates to the communication field, more particularly to methods and devices for notifying and determining patterns of common reference signals (CRS).

BACKGROUND OF THE INVENTION

A long term evolution (LTE) technology is researched and developed based on technology accumulation of super 3G by 3rd Generation Partnership Project (3GPP) for over ten years in order to confront challenges of mobile broadband wireless access (MBWA) technologies such as Worldwide Interoperability for Microwave Access (WiMAX) and the like with the development of mobile communication broadband. The LTE technology has succeeded substantively by the end of 2008 for four years' standardization. An orthogonal frequency division multiplexing (OFDM) is the technical standard to eliminate interferences in cells maximally; however, higher inter-cell interferences (ICI) will happen because the LTE-A technology is still in the same-frequency network, thereby reducing experiences of edge users greatly and limiting the entire capacity of a system largely.

Many technologies, such as power control, flexible spectrum reuse, random interference elimination and the like, are raised and discussed by 3GPP and other organizations to address the issue. These technologies have potential benefit to increase cell-edge user throughput widely, which, however, will cost the whole cell throughput. Accordingly, a coordinated multiple point (CoMP) transmission technology is proposed. The CoMP technology is incorporated into the LTE-A frame in the 54th 3GPP RAN1 conference in August, 2008. As a promising candidate technology in the LTE-A (LTE-advanced), the CoMP transmission technology plays a role in introducing coordination among base stations and sharing necessary information among the coordinated base stations, thereby inhibiting the ICI effectively, significantly improving the cell-edge user throughput and enhancing the performance of the system. For example, a joint transmission (JT) solution of the CoMP transmission technology is that the coordinated cells serve for one or a plurality of users simultaneously by sharing data information and control information thereamong, as shown in FIG. 2. Thus, the interference in each cell can be eliminated and can be transformed into an available signal, thereby greatly improving the cell-edge user performance. However, this solution requires user equipment (UE) to feed back channel information of a plurality of cells and even relative inter-cell channel information so as to ensure joint scheduling, precoding and data transmission implemented by the plurality of cells.

In the LTE-A system, UE estimates channel information from a base station to the UE based on a channel state information reference signal (CSI-RS) configured by the UE, and calculates a channel quality indicator (CQI) and feeds it back thereto, wherein an index of a precoding matrix indicator (PMI) and rank indication (RI, i.e. the number of data streams) may be fed back with the CQI. Thereafter, UE may feed back downlink RI/PMI/CQI in a physical uplink shared channel (PUSCH) in a specific feedback mode after triggering an instruction by downlink control information (DCI) from the base station. Meanwhile, if the cell is configured with a plurality of downlink carrier, it is required to indicate the channel information of the specific carrier to be fed back in the triggered instruction. To obtain channel information of a plurality of transmission points, an upper layer signaling may be used to configure a measurement set for the UE, wherein the measurement set may contain measurement information of the plurality of transmission points, namely, information of a downlink reference signal corresponding to each transmission point. The UE receives the information to measure and feed back downlink channel information of reference signals in the measurement set.

Table 1 illustrates conclusions reached based on triggering of aperiodic CSI feedbacks in R11.

TABLE 1

| 2 bit DCI | Triggered Aperiodic Feedback Sets |
|---|---|
| 00 | no triggered aperiodic CSI feedback |
| 01 | an aperiodic CSI feedback set configured by an upper layer signaling aiming at a primary carrier |
| 10 | aperiodic CSI feedback set 1 configured by an upper layer signaling |
| 11 | aperiodic CSI feedback set 2 configured by an upper layer signaling |

Wherein, bits in first DCI is configured to be 00, which represents no triggered aperiodic CSI feedback; bits in the first DCI are configured to be 01, which represents an aperiodic CSI feedback set configured by the upper layer signaling aiming at the primary carrier; bits in the first DCI are configured to be 10, which represents a first aperiodic CSI feedback set configured by the upper layer signaling; and bits in the first DCI are configured to be 11, which represents a second aperiodic CSI feedback set configured by the upper layer signaling.

Additionally, to realize CoMP transmission, only when the UE knows a common reference signal (CRS) configuration of each cell and whether transmission subframes are multicast broadcast single frequency network (MBSFN) subframes, it can correctly demodulate physical downlink shared channels (PDSCH) of all cells served therefor. Because R10 LTE is designed for multiple-input multiple-out-put (MIMO) of a single cell without consideration on CoMP transmission, the UE merely knows CRS configuration and MBSFN sub-frame configuration of a main cell thereof but the related configurations of coordinated cells thereof, so that the UE fails to correctly demodulate the PDSCH when the coordinated cells transmit the PDSCH (JT or DPS) to the UE.

Concerning the issue that how the CoMP UE knows a CRS pattern used by the current PDSCH mapping discussed by 3GPP at present, configuration of a new signalling to notify the UE, namely, CRS pattern DCI (CRS pattern DCI) has been achieved. The solution generally includes support to notify the UE of CRS configuration of one cell and support to notify the UE of CRS configurations of three cells. The specific solution is that candidate CRS pattern sets to support one or three cells are configured in accordance with a radio resource control (RRC) protocol and then the CRS pattern DCI is used to notify the UE of the CRS pattern used by the current PDSCH mapping, so that a user may demodulate the PDSCH correctly. The former has the advantage of lower CRS overhead and the disadvantage of poor flexibility, in which only one cell is required to transmit normal subframes and the remaining cells transmit MBSFN subframes during JT transmission; while the latter can support relatively more JT transmission modes. However, the existing solution still fails to support all the CoMP transmission schemes and can be improved greatly in the flexibility.

A provision of an effective solution is not made aiming at the transmission scheme where poor flexibility and failure to support the CoMP transmission system completely exist in the CRS pattern notification solution in the related arts. Furthermore, communication resources occupied by various signalling in the communication system are valuable, so it is determined that special DCI must be used to trigger the aperiodic CSI feedback in the discussion of the LTE-A standardization, and meanwhile, the issue that how to use the DCI sufficiently is worth being considered in the industry.

DESCRIPTION OF THE INVENTION

Concerning the transmission scheme where the poor flexibility and failure to support the CoMP transmission system completely exist in the CRS pattern notification solution in the related arts, and insufficient utilization of DCI required for triggering the aperiodic CSI feedback, methods and devices for notifying and determining patterns of common reference signals (CRS) are provided, which can be used to transmit bits in first and second DCI to the UE and then exactly notify the UE of the CRS patterns in accordance with correspondences between preconfigured bits and a plurality of CoMP transmission scheme.

The technical solution of the disclosure is such realized that:

A method for notifying common reference signal (CRS) patterns is provided according to one aspect of the disclosure, which is used for notifying the CRS patterns in a CoMP transmission system.

The method comprises the steps of transmitting first downlink control information (DCI) to user equipment (UE) to inform the UE an aperiodic channel status information (CSI) feedback set and a CoMP transmission scheme to be applied to the UE, wherein the CoMP transmission includes a plurality of possible combinations of transmission points that transmit PDSCH to the UE; and transmitting second DCI to the UE for notifying a CRS pattern to the UE based on the first DCI.

A method for determining common reference signal (CRS) patterns is provided according to another aspect of the disclosure, which is used for determining the CRS patterns in the CoMP transmission scheme.

The method comprises the steps of receiving first downlink control information (DCI) by UE from network to obtain an aperiodic channel status information (CSI) feedback set and a CoMP transmission scheme to be applied to the UE, wherein the COMP transmission scheme includes a plurality of possible combinations of transmission points that transmit physical downlink shared channels (PDSCH) to the UE; and receiving second downlink control information (DCI) by the UE to obtain a CRS pattern based on the first DCI.

A device for notifying common reference signal (CRS) patterns, arranged at network, is provided according to another aspect of the disclosure, which is used for notifying the CRS patterns in the CoMP transmission system.

The device includes a communication module for transmitting first downlink control information (DCI) to user equipment (UE) to inform the UE an aperiodic channel status information (CSI) feedback set and a CoMP transmission scheme to be applied to the UE, and transmitting second DCI to the UE for notifying a CRS pattern to the UE based on the first DCI, wherein the CoMP transmission includes a plurality of possible combinations of transmission points that transmit PDSCH to the UE.

A device for determining common reference signal (CRS) patterns, arranged at UE, is provided according to another aspect of the disclosure, which is used for determining the CRS patterns in the CoMP transmission system.

A device for determining coordinated multiple point (CoMP) transmission parameters, arranged at UE, is provided according to another aspect of the disclosure.

The device includes a communication module for receiving first downlink control information (DCI) from network to obtain an aperiodic channel status information (CSI) feedback set and a CoMP transmission scheme to be applied to the UE, and receiving second DCI to obtain a CRS pattern based on the first DCI, wherein the COMP transmission scheme includes a plurality of possible combinations of transmission points that transmit physical downlink shared channels (PDSCH) to the UE.

A non-transient storage medium having embodied thereon a computer program configured to cause a processor to implement a notification technique for common reference signal (CRS) patterns is provided according to another aspect of the disclosure. The computer program comprises code segments configured to cause a processor to:

transmitting first downlink control information (DCI) to user equipment (UE) to inform the UE an aperiodic channel status information (CSI) feedback set and a CoMP transmission scheme to be applied to the UE, wherein the CoMP transmission includes a plurality of possible combinations of transmission points that transmit PDSCH to the UE; and transmitting second DCI to the UE for notifying a CRS pattern to the UE based on the first DCI.

A non-transient storage medium having embodied thereon a computer program configured to cause a processor to implement a determination technique for common reference signal (CRS) patterns. The computer program comprises code segments configured to cause a processor to:

receiving first downlink control information (DCI) by UE from network to obtain an aperiodic channel status information (CSI) feedback set and a CoMP transmission scheme to be applied to the UE, wherein the COMP transmission scheme includes a plurality of possible combinations of transmission points that transmit physical downlink shared channels (PDSCH) to the UE; and receiving second DCI to obtain a CRS pattern based on the first DCI.

In the disclosure, the first DCI is used to notify a terminal of the specific CoMP transmission scheme by virtue of configuring correspondences between bits in the first DCI and the plurality of CoMP transmission schemes, so that bits in the second DCI represent all the possible CRS configurations in the currently-adopted CoMP transmission scheme, thereby exactly notifying the UE of the CRS patterns, supporting all the CoMP transmission schemes and notifications of all the CRS patterns therein, effectively perfecting the notifications of the CRS patterns, and obviously improving the flexibility. Furthermore, by the technical solution of the disclosure, the bits in the DCI can be utilized sufficiently, and more information may be notified by the minimal signalling, thereby effectively saving the signalling overheads.

BRIEF DESCRIPTION OF THE DRAWINGS

The following description to figures in the embodiments is made to illustrate the embodiments of the disclosure or the technical solution in the prior art clearly. Obviously, the following figures are illustrative of some embodiments of the disclosure merely. A person skilled in the art may obtain other figures without creative works according to these figures.

DETAILED DESCRIPTION OF ILLUSTRATIVE EMBODIMENTS

The technical solutions of the embodiments of the disclosure will be described clearly and completely in conjunction with the figures herein. Obviously, the described embodiments are a part of the embodiments of the disclosure. A person skilled in the art can obtain other embodiments within the scope of the disclosure based on the embodiments herein.

A method for notifying transmission parameter in a CoMP transmission system is provided according to some embodiments of the disclosure.

The method comprises the steps of transmitting first downlink control information (DCI) to user equipment (UE) to inform the UE an aperiodic channel status information (CSI) feedback set and a CoMP transmission scheme to be applied to the UE, wherein the CoMP transmission includes a plurality of possible combinations of transmission points that transmit PDSCH to the UE; and transmitting second DCI to the UE for notifying transmission parameter to the UE based on the first DCI.

According to one embodiment of the disclosure, the transmission parameters may be the CRS patterns. Therefore, the method for notifying the parameters of the disclosure may be used to notify a terminal of the CRS patterns, in the embodiment. It is understood that the transmission parameters may be the CRS patterns and other parameters, control information and the like associated with CoMP transmission modes. The description is made by taking the CRS patterns for example.

Figure 1:
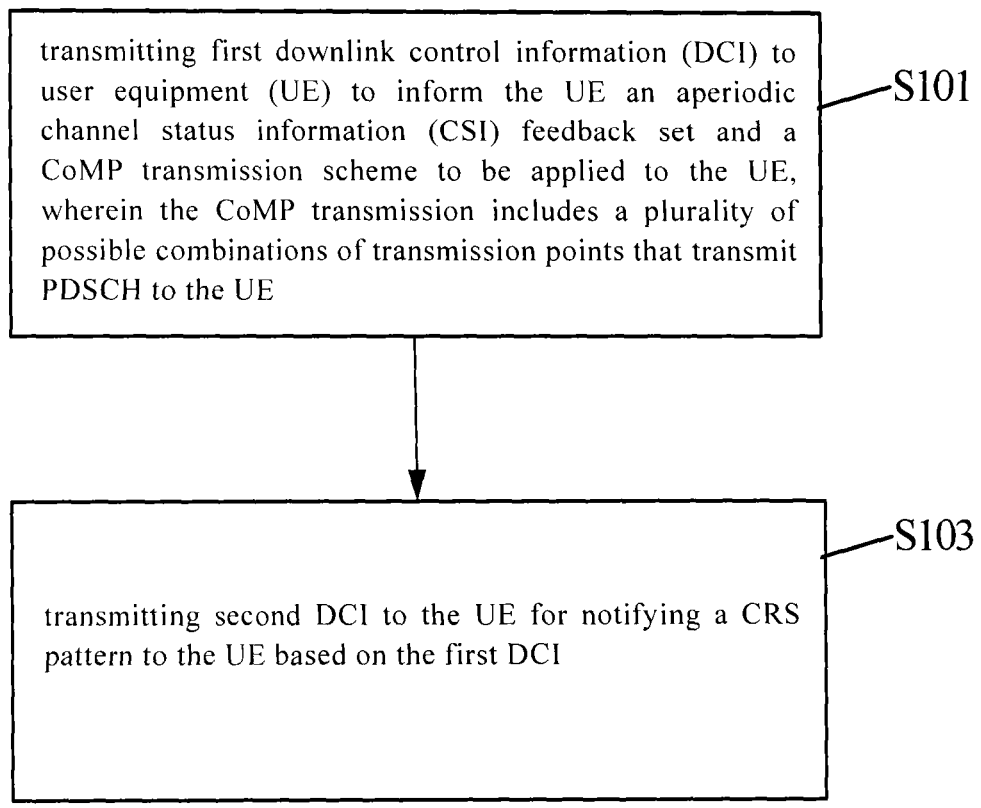
FIG. 1 is a flow chart of a method for notifying common reference signal (CRS) patterns according to some embodiments of the disclosure.

FIG. 1 shows in the embodiment of notifying the CRS patterns the method comprising S101: transmitting first downlink control information (DCI) to user equipment (UE) to inform the UE an aperiodic channel status information (CSI) feedback set and a CoMP transmission scheme to be applied to the UE, wherein the CoMP transmission includes a plurality of possible combinations of transmission points that transmit PDSCH to the UE;

S103: transmitting second DCI to the UE for notifying a CRS pattern to the UE based on the first DCI.

In addition, the method also comprises the step of notifying the UE of correspondences between the bits in the first downlink control information and the plurality of CoMP transmission schemes as well as correspondences between bits in the second DCI and the CRS patterns in each CoMP transmission scheme by a radio resource control (RRC) signalling prior to triggering the aperiodic CSI feedback.

Wherein bits in the first downlink control information (DCI) are used for indicating the aperiodic CSI feedback set and the CoMP transmission scheme simultaneously, and bits in the second DCI are used for indicating one of a plurality of candidate CRS patterns in a specific CoMP transmission scheme.

Wherein a CoMP transmission scheme suitable for the UE is determined, and bits to be transmitted in the first DCI are determined in accordance with a determination result of the CoMP transmission scheme and correspondences between preconfigured bits and a plurality of CoMP transmission schemes.

In addition, the method further comprises the steps of determining transmission points for carrying out CoMP transmission in the CoMP transmission scheme in accordance with CSI feedbacks of the UE, determining corresponding CRS patterns in accordance with a current subframe transmission situation of each transmission points, and determining bits to be transmitted in the second DCI in accordance with correspondences between preconfigured bits and a plurality of possible CRS patterns in the CoMP transmission scheme.

Moreover, when the number of the bits in the first DCI is n, the bits therein represent at most $2^n-1$ CoMP transmission schemes.

Figure 2:
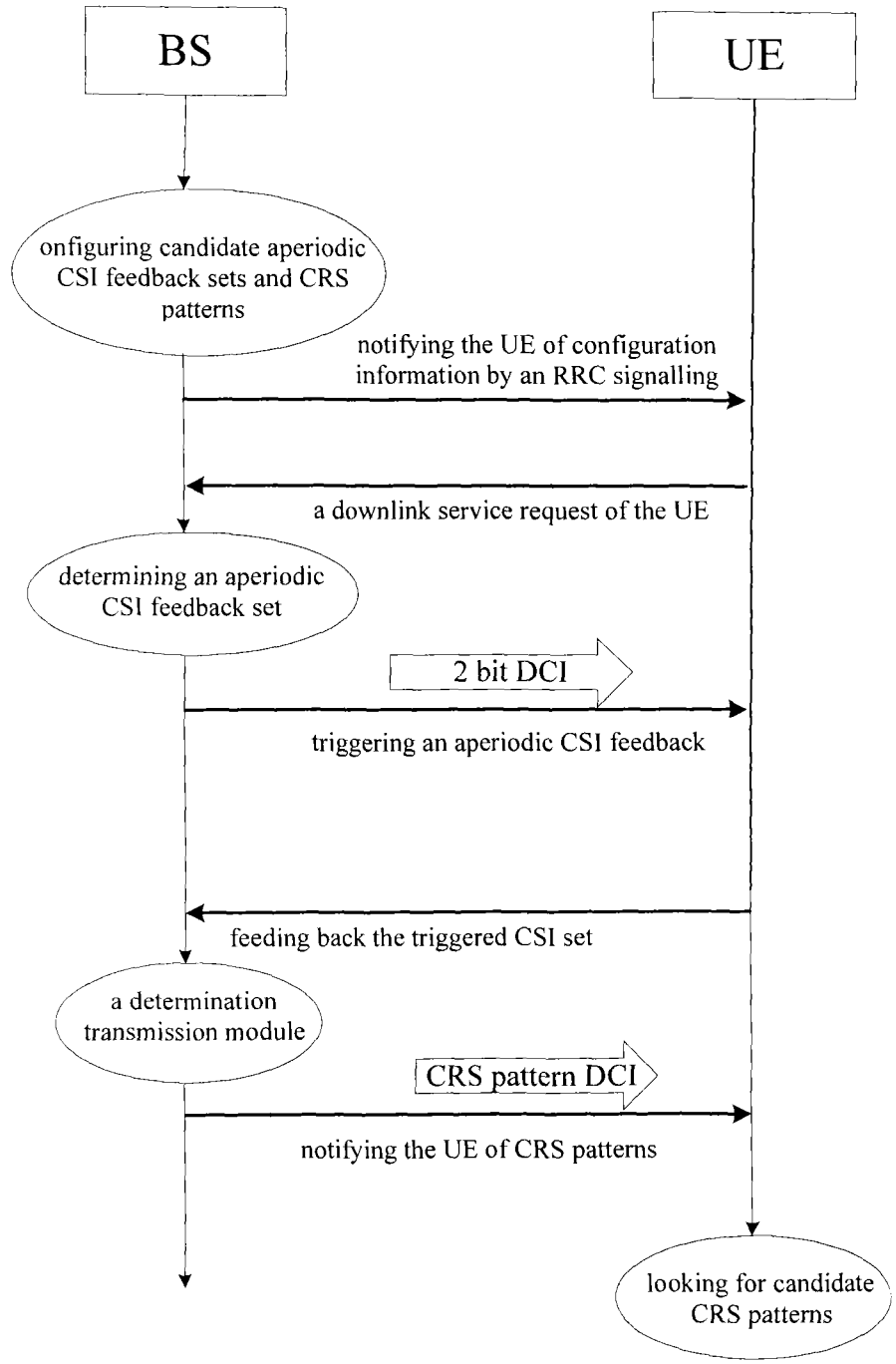
FIG. 2 is a flow chart of triggering aperiodical CSI feedbacks and looking for CRS pattern configurations according to some embodiments of the disclosure.

FIG. 2 illustrates a flow chart of a signalling of triggering aperiodic CSI feedbacks and transmitting CRS pattern DCI, wherein the BSs configure candidate aperiodic CSI feedback sets and CRS patterns and notify the UE of configuration information by an RRC signalling; the UE transmits a downlink service request; the BSs determine an aperiodic CSI feedback set and then trigger an aperiodic CSI feedback report by 2 bit DCI (corresponding to the first downlink control information); the UE feeds back the triggered CSI set; and the BSs notify the UE of the CRS patterns by the CRS pattern DCI (corresponding to the second downlink control information) after determining a transmission mode and then the UE looks for the candidate CRS patterns.

Wherein the aperiodic CSI feedback is triggered, based on the technical solution of the disclosure, the UE can provide a rough estimation for the current CoMP transmission scheme in accordance with the triggered aperiodic CSI feedback, that is, when the aperiodic CSI feedback is triggered, partial information on the CoMP transmission scheme may be obtained by the UE, which may be utilized to achieve the purpose of supporting all the CRS patterns when the candidate CRS patterns are configured and the UE is notified, by the CRS pattern DCI, the CRS pattern used by the current PDSCH mapping.

Based on whether the CoMP transmission points transmit the PDSCHs to the CoMP UE, the CoMP transmission scheme is classified into $2^n-1$, wherein n is the number of bits for triggering the aperiodic CSI feedback. Specifically, by taking the number of bits in the first DCI being 2 and the number of the BSs providing the CoMP transmission for the UE being 3 (the CoMP set contains 3 BSs) for example, correspondences between the preconfigured bits and the plurality of CoMP transmission schemes may be as follows:

The bits in the first DCI are 01, representing that all the transmission points providing the CoMP transmission for the UE transmit the PDSCHs to the UE (corresponding to case 1 in Table 2);

The bits in the first DCI are 10, representing that a first neighbor cell BS in all the transmission points providing the CoMP transmission for the UE does not transmit the PDSCHs to the UE (corresponding to case 2 in Table 2); and The bits in the first DCI are 11, representing that a second neighbor cell BS in all the transmission points providing the CoMP transmission for the UE does not transmit the PDSCHs to the UE (corresponding to case 2 in Table 3).

As known in the Background, at least 2 bit DCI is needed to trigger the aperiodic CSI feedback. In the disclosure, the 2 bit DCI is further used for representing which the BSs transmit the PDSCHs to the UE so as to represent the CoMP transmission scheme, see Table 2 (i.e. the correspondences between the bits in the first DCI and the plurality of CoMP transmission schemes).

TABLE 2

| 2 bit DCI | Triggered Aperiodic Feedback Set |
|---|---|
| 00 | no triggered aperiodic feedback set |
| 01 | an aperiodic feedback set configured by an upper layer signaling aiming at a primary carrier according to case 1 of the CoMP transmission scheme |
| 10 | an aperiodic feedback set 1 configured by an upper layer signaling aiming at a primary carrier according to case 2 of the CoMP transmission scheme |
| 11 | an aperiodic feedback set 2 configured by an upper layer signaling aiming at a primary carrier according to case 3 of the CoMP transmission scheme |

This means that when the CoMP set contains 3 BSs (BS0, BS1 and BS2, wherein BS0 is a main cell) and n is 2, the CoMP transmission schemes can be classified into three cases as follows:

case 1: BS0, BS1 and BS2 transmit the PDSCH to the UE;
case 2: BS1 does not transmit the PDSCH to the UE; and
case 3: BS2 does not transmit the PDSCH to the UE.

Thus, the solutions for notifying and determining the patterns provided in the disclosure can be used for supporting to notify the UE of CRS configurations of three cells or one cell, respectively. Compared with the existing similar solutions, the solutions of the disclosure have the advantage of more flexibility in the same overheads, or less overheads in the same flexibility.

It is noted that the correspondences between the bits and the transmission schemes are not limited to the cases shown in the Table and may be modified depending on the actual demands.

Thus, when the transmission set contains more than 3 BSs, the n bits represent possible CoMP transmission schemes in the current transmission set. Meanwhile, by virtue of the correspondences configured in accordance with Table 3, a plurality of feedback sets and the currently possible CoMP transmission schemes can be notified to the UE by n bit DCI.

It is noted that the correspondences between the bits and the transmission schemes are not limited to the cases shown in the Table and may be modified depending on the actual demands.

TABLE 3

| n bit DCI | Triggered Aperiodic Feedback Set |
|---|---|
| 00 . . . 00 | no triggered aperiodic feedback set |
| 00 . . . 01 | an aperiodic feedback set configured by an upper layer signaling aiming at a primary carrier according to case 1 of the CoMP transmission scheme |
| 00 . . . 10 | an aperiodic feedback set 1 configured by an upper layer signaling aiming at a primary carrier according to case 2 of the CoMP transmission scheme |
| 00 . . . 11 | an aperiodic feedback set 2 configured by an upper layer signaling aiming at a primary carrier according to case 3 of the CoMP transmission scheme |
| . . . | . . . |
| 11 . . . 11 | an aperiodic feedback sets ($2^n$-2) configured by an upper layer signaling according to case ($2^n$-1) of the CoMP transmission scheme |

For example, when n bits in the first DCI represent a plurality of CoMP transmission schemes, the CRS patterns corresponding to each CoMP transmission scheme are configured as shown in Table 4, namely, the candidate CRS patterns.

TABLE 4

| CoMP Transmission scheme | CRS pattern |
|---|---|
| Case 1 | possible CRS patterns and CRS pattern DCI designs corresponding thereto in Case 1 |
| Case 2 | possible CRS patterns and CRS pattern DCI designs corresponding thereto in Case 2 |
| Case 3 | possible CRS patterns and CRS pattern DCI designs corresponding thereto in Case 3 |
| . . . | . . . |
| case ($2^n$-1) | possible CRS patterns and CRS pattern DCI designs corresponding thereto in Case ($2^n$-1) |

From the foregoing, the BSs may determine the current CRS patterns in accordance with the triggered aperiodic CSI feedback and the specific transmission scheme, which means that one CRS pattern selected from Table 4 is notified to the UE. Thereafter, the UE can record the triggered aperiodic CSI feedback set, based on which, the UE determines the CRS patterns used in the current PDSCH transmission in accordance with the CRS pattern DCI.

The description to the disclosure will be made comprehensively in conjunction with the specific embodiments.

Embodiment I: (Support to Notify the UE of CRS Patterns of Three Cells)

Figure 3:
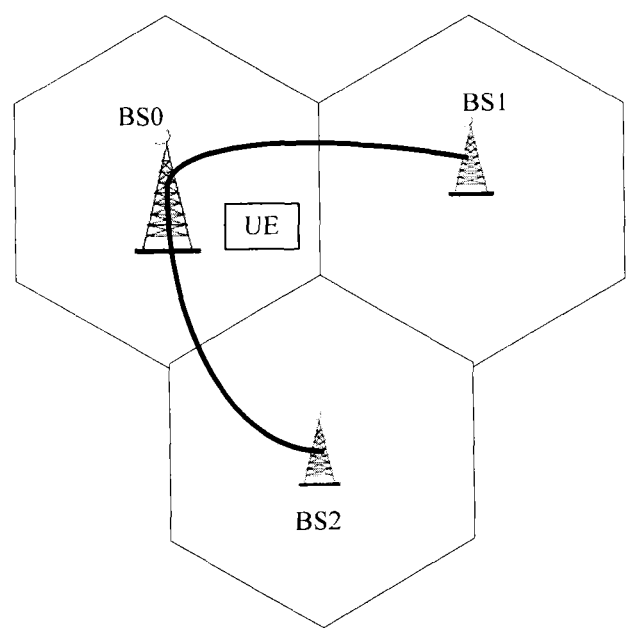
FIG. 3 is a schematic diagram of a network scenario applied to case 1 according to solutions of the embodiments of the disclosure.

The following description will be made by taking TR36.819 CoMP scenario 2 for example. Refer to FIG. 3, a CoMP measurement set contains 3 BSs (BS0, BS1 and BS2, wherein BS0 is a main cell and the remaining cells are coordinated cells), n is 2, BS0 is eNB, BS1 and BS2 are high Tx power RRHs, and the connection among the BSs is achieved by fibers or other manners. FIG. 3 illustrates a flow chart of triggering the aperiodic CSO feedbacks and looking for CRS pattern configurations. The steps to be implemented are as follows:

Step 1: classifying all the possible CoMP transmission schemes into the following cases based on whether the CoMP transmission points transmit the PDSCHs to the UE:

case 1: BS1 and BS2 transmit the PDSCH to the current UE;

case 2: BS1 does not transmit the PDSCH to the current UE; and case 3: BS2 does not transmit the PDSCH to the current UE.

Wherein, in case 1, BS0, BS1 and BS2 transmit the PDSCHs to the UE, or BS1 and BS2 transmits the PDSCHs to the current UE. Because BS0 is the main cell of the current UE, the possibility (BS1 and BS2 transmit the PDSCH to the current UE) is very low. The three CoMP transmission schemes may be further simplified as follows:

case 1: BS0, BS1 and BS2 transmit the PDSCH to the UE;

case 2: BS1 doesn't transmit the PDSCH to the UE; and case 3: BS2 doesn't transmit the PDSCH to the UE.

Step 2: configuring aperiodic CSI feedbacks in accordance with the different transmission schemes based on the conclusions reached by triggering the aperiodic CSI feedbacks in R11, as shown in Table 1. In this step, results of configuring demands of the corresponding aperiodic CSI feedbacks in accordance with the classification of the CoMP transmission schemes in Step 2 are shown in Table 2.

Step 3: configuring candidate CRS patterns respectively in accordance with the three CoMP transmission schemes.

For convenience of the description, the CRS pattern is A, B or C if BS0, BS1 and BS2 transmits normal subframes, respectively; and when the BS transmits the MBSFN, the CRS pattern is marked as X. For example, it is assumed that BS0 and BS1 transmit the PDSCHs to the UE currently, when BS0 and BS1 are the normal sub-frames, the CRS pattern is AB; when BS0 and BS1 are a normal subframe and an MBSFN subframe, respectively, the CRS pattern is A or B; and when BS0 and BS1 are MBSFN subframes, the CRS pattern is X. Accordingly, all possible CRS patterns corresponding to the three CoMP transmission schemes in Step 1 are shown in Table 5.

TABLE 5

| CoMP Transmission schemes | Possible CRS Patterns |
|---|---|
| Case 1: (BS0, BS1, BS2) | ABC, AB, AC, BC, B, C, A, X |
| Case 2: (BS0, BS2), (BS0), (BS2) | AC, A, C, X |
| Case 3: (BS0, BS1), (BS0), (BS1) | AB, B, A, X |

BS0 is the main cell, so the UE may be informed of MBSFN subframe configuration information of the BS0 through system information. Thus, some CRS patterns in case 1 can be combined (the UE is required to consider the MBSFN subframe configuration information in case 1), for example, $$AB = \begin{cases} AB, \text{ if } BS0 \text{ transmits the normal subframes} \\ B, \text{ if } BS0 \text{ transmits the } MBSFN \text{ subframes} \end{cases}$$

Similarly, the CRS pattern ABC may be obtained by combining the CRS pattern ABC with the CRS pattern BC; the CRS pattern AB may be obtained by combining the CRS pattern AB with the CRS pattern B; and the CRS pattern AC may be obtained by combining the CRS pattern AC with the CRS pattern C. The above possible CRS patterns may be further simplified as shown in Table 6:

TABLE 6

| CoMP Transmission schemes | CRS Patterns |
|---|---|
| Case 1: (BS0, BS1, BS2) | ABC, AB, AC, A |
| Case 2: (BS0, BS2), (BS0), (BS2) | AC, A, C, X |
| Case 3: (BS0, BS1), (BS0), (BS1) | AB, A, B, X |

Accordingly, there may be four possible CRS patterns in each CoMP transmission case, represented by 2 bits, respectively (corresponding to bits in the second DCI), i.e. the candidate CRS patterns may be configured as shown in Table 7 (i.e. the correspondences between the bits in the second DCI and the CRS patterns in each CoMP transmission scheme are notified to the UE):

TABLE 7

| CRS Pattern DCI | CRS Patterns | | |
|---|---|---|---|
| | case1 | case2 | case3 |
| 00 | ABC | C | B |
| 01 | AB | X | X |
| 10 | AC | AC | AB |
| 11 | A | A | A |

It is noted that the correspondences between the bits and the CRS patterns are not limited to the cases shown in Tables 5, 6 and 7 and are may be modified depending on the actual demands.

Step 4: notifying by the BS the UE of the aperiodic CSI feedbacks and the configuration information of the CRS patterns through the RRC signalling, as shown in Tables 2 and 7.

Step 5: transmitting a downlink data transmission request to the BSs by the UE, and triggering the aperiodic feedback of the UE by using 2 bit DCI (corresponding to the first DCI) after the BSs receive the request, for example, transmitting 11 to the UE is used to trigger the aperiodic feedback corresponding to case 3.

Step 6: receiving the triggering of the aperiodic CSI by the UE, finding out the aperiodic feedback corresponding to 11 in Table 2, feeding the corresponding aperiodic CSI back to the BS, and recoding the transmission scheme corresponding to the triggered aperiodic feedback 11, i.e. case 3, for the purpose of looking for the subsequent CRS patterns.

Step 7: receiving, by the BSs, the aperiodic CSI fed back by the UE, and based on which, determining a specific CoMP transmission scheme. By taking CoMP JT for example, the BS0 and BS1 transmit the PDSCHs to the UE currently at the same time, and possible CRS patterns are AB, A, B and X depending on whether the normal subframes are transmitted. If the BS0 and BS1 transmit the normal subframes currently, the CRS pattern is AB. Refer to Table 7, 2 bit CRS pattern DCI 10 (corresponding to the second DCI) is transmitted to the UE in order for notification of the current CRS pattern.

Step 8: receiving 2 bit CRS pattern DCI by the UE and looking for the corresponding CRS pattern in Table 7 by combining the information of triggering the aperiodic CSI of 2 bit DCI in step 6. Accordingly, the CRS pattern should be AB.

Embodiment II (Support to Feed Back the CRS of One Cell)

Figure 4:
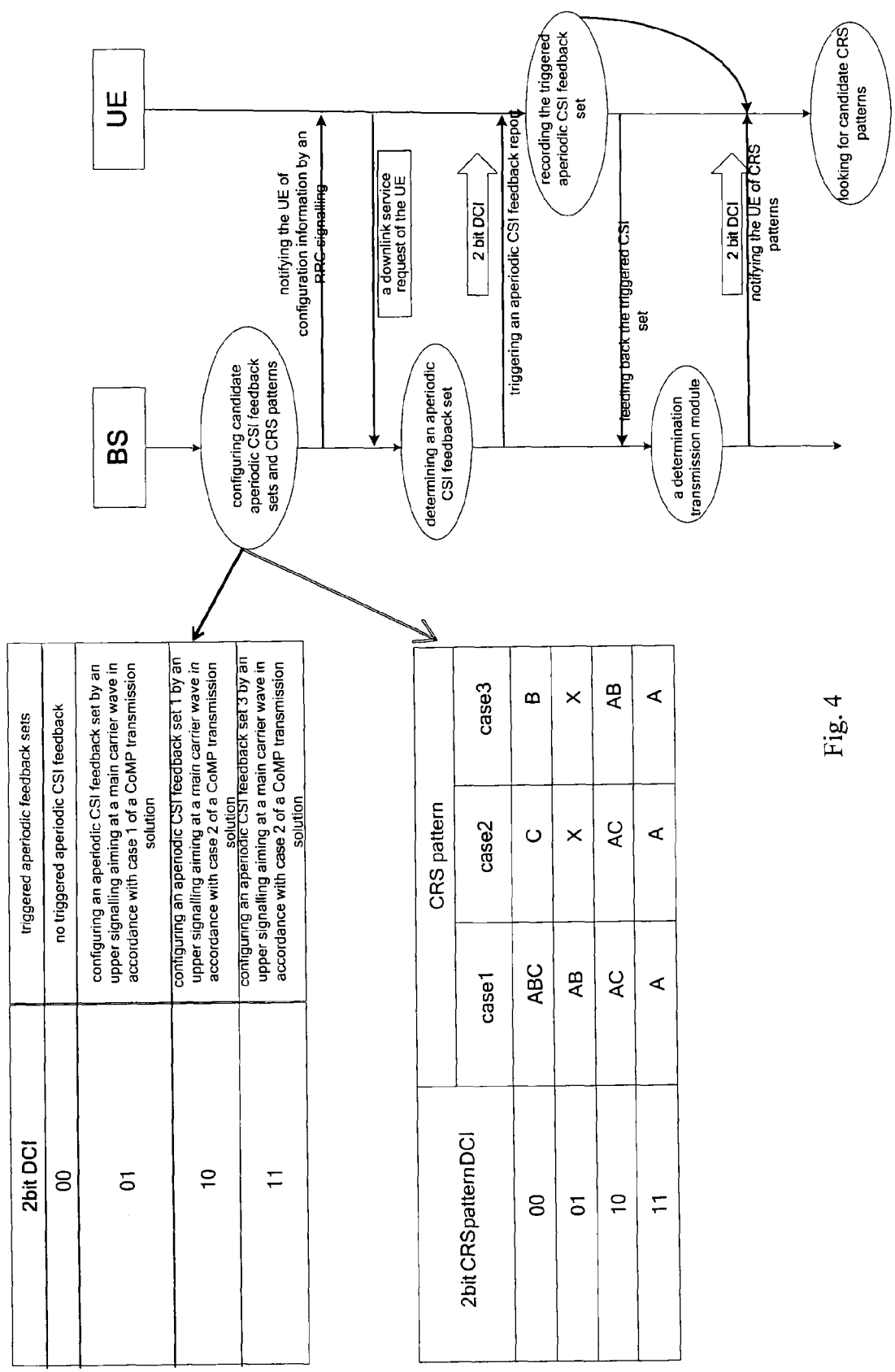
FIG. 4 is a flow chart of signalling of triggering aperiodical CSI feedbacks and looking for CRS pattern configurations applied to case 1 according to solutions of the embodiments of the disclosure.
Figure 5:
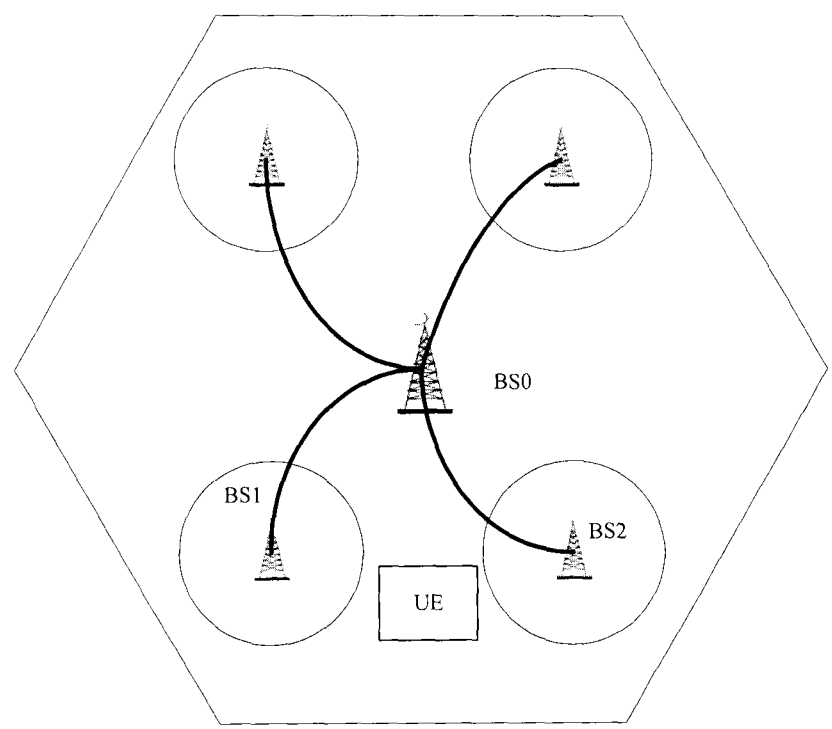
FIG. 5 is a schematic diagram of a network scenario applied to case 2 according to solutions of the embodiments of the disclosure.
Figure 6:
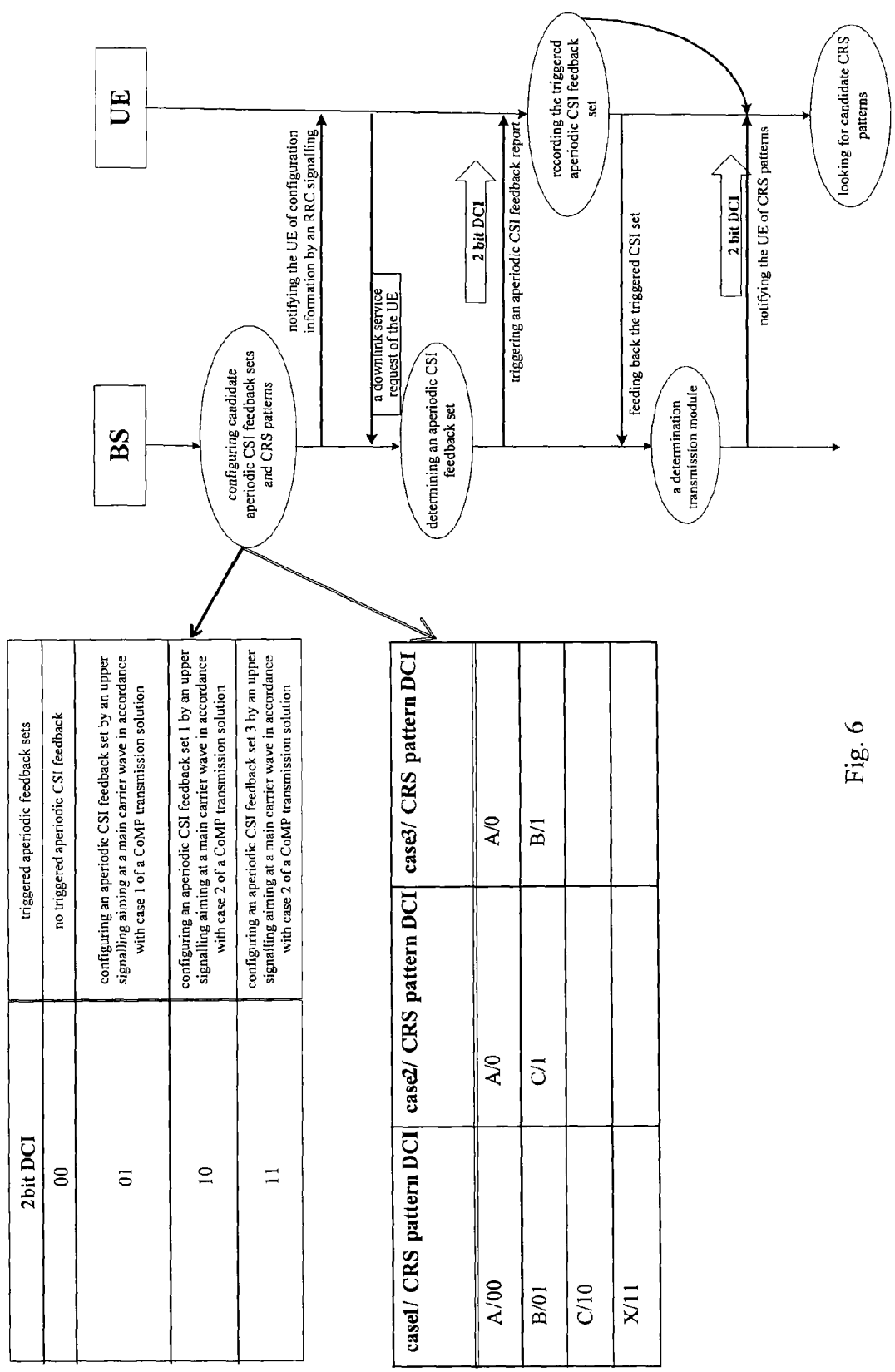
FIG. 6 is a flow chart of signalling of triggering aperiodical CSI feedbacks and looking for CRS pattern configurations applied to case 2 according to solutions of the embodiments of the disclosure.

By taking a TR36.819 CoMP scenario for example, as shown in FIG. 4, the CoMP measurement set contains 3 BSs (BS0, BS1 and BS2, wherein BS0 is a main cell and the remaining cells are coordinated cells), n is 2, BS0 is eNB, BS1 and BS2 and other BSs are low Tx power RRH, and the connection among the BSs is achieved by fibers or other manners. FIG. 6 illustrates a flow chart of triggering aperiodic CSI feedbacks and looking for CRS pattern DCI configurations. The steps to be implemented are as follows:

Step 1: classifying all the possible CoMP transmission schemes into the following cases based on whether the CoMP transmission points transmit the PDSCHs to the UE:

case 1: BS1 and BS2 transmit PDSCH to the current UE;

case 2: BS1 does not transmit PDSCH to the current UE; and case 3: BS2 does not transmit PDSCH to the current UE.

Wherein, case 1 comprises that BS0, BS1 and BS2 transmit the PDSCHs to the UE and BS1 and BS2 transmits the PDSCHs to the current UE. Because the BS0 is the main cell of the current UE, the possibility (BS1 and BS2 transmit the PDSCH to the current UE) is very low. The three CoMP transmission schemes may be further simplified as follows:

case 1: BS0, BS1 and BS2 transmit the PDSCH to the current UE;

case 2: None of BS0, BS1 and BS2 transmits the PDSCH to the UE; and case 3: None of BS0, BS1 and BS2 transmits the PDSCH to the UE.

Step 2: configuring aperiodic CSI feedbacks in accordance with the different transmission schemes.

Based on the conclusions reached by triggering the aperiodic CSI feedbacks in R11, as shown in Table 1. Results of configuring demands of the corresponding aperiodic CSI feedbacks in accordance with the classification of the CoMP transmission schemes in Step 2 are shown in Table 2.

Step 3: configuring candidate CRS patterns respectively in accordance with the three CoMP transmission schemes.

For convenience of the description, the CRS pattern is A, B or C if the BS0, BS1 and BS2 transmit normal subframes, respectively; and when the BSs transmit the MBSFN, the CRS pattern is marked as X. For example, it is assumed that the BS0 and BS1 transmit the PDSCHs to the UE currently, when the BS0 and BS1 are the normal sub-frames, the CRS pattern is AB; when the BS0 and BS1 are a normal subframe and an MBSFN subframe respectively, the CRS pattern is A or B; and when the BS0 and BS1 are MBSFN subframes, the CRS pattern is X. Accordingly, all possible CRS patterns corresponding to the three CoMP transmission schemes in Step 1 are shown in Table 6. Because the notification of a CRS pattern of one cell to the UE is supported only in the example, some CRS patterns in cases 2 and 3 in Table 3 may be combined (thus, the UE is required to consider MBSFN subframe configuration information in cases 2 and 3). Table 6 can be simplified into Table 8:

TABLE 8

| CoMP Transmission schemes | CRS Patterns |
|---|---|
| Case 1: (BS0, BS1, BS2) | A, B, C, X |
| Case 2: (BS0, BS2), (BS0), (BS2) | A, C |
| Case 3: (BS0, BS1), (BS0), (BS1) | A, B |

This means that there are four possible CRS patterns in each CoMP transmission case, represented by 2 bit, while there are two possible CRS patterns in cases 2 and 3, represented by 1 bit. Therefore, the candidate CRS patterns can be configured as shown in Table 9:

TABLE 9

| case1/CRS Pattern DCI | case2/CRS Pattern DCI | case3/CRS Pattern DCI |
|---|---|---|
| A/00 | A/0 | A/0 |
| B/01 | C/1 | B/1 |
| C/10 | | |
| X/11 | | |

It is noted that the correspondences between the bits and the CRS patterns are not limited to the cases shown in Table 9, and are may be modified depending on the actual demands.

Step 4: notifying by the BSs the UE of the aperiodic CSI feedbacks and the configuration information of the CRS patterns through the RRC signalling (corresponding to the first DCI), as shown in Tables 2 and 9.

Step 5: transmitting a downlink data transmission request to the BSs by the UE, and triggering the aperiodic feedback of the UE by using 2 bit DCI after the BSs receive the request, for example, transmitting 10 to the UE is used to trigger the aperiodic feedback corresponding to case 2.

Step 6: receiving the triggering of the aperiodic CSI by the UE, finding out the aperiodic feedback corresponding to 10 in Table 2, feeding the corresponding aperiodic CSI back to the BS, and recoding the transmission scheme corresponding to the triggered aperiodic feedback 10, i.e. case 2, for the purpose of looking for the subsequent CRS patterns.

Step 7: receiving by the BS the aperiodic CSI fed back by the UE, and based on which, determining a specific CoMP transmission scheme. By taking CoMP DPS for example, the BS1 transmits the PDSCHs to the UE currently, and possible CRS patterns are C and X depending on whether the normal subframes are transmitted. If the BS1 transmits the normal subframes currently, the CRS pattern is B. Refer to Table 9, 1 bit CRS pattern DCI 1 (corresponding to the second DCI) is transmitted to the UE in order for notification of the current CRS pattern.

Step 8: receiving 1 bit CRS pattern DCI by the UE and looking for the corresponding CRS pattern in Table 9 by combining the information of triggering the aperiodic CSI of 2 bit DCI in step 6. Accordingly, the CRS pattern should be B.

Embodiment III

Figure 7:
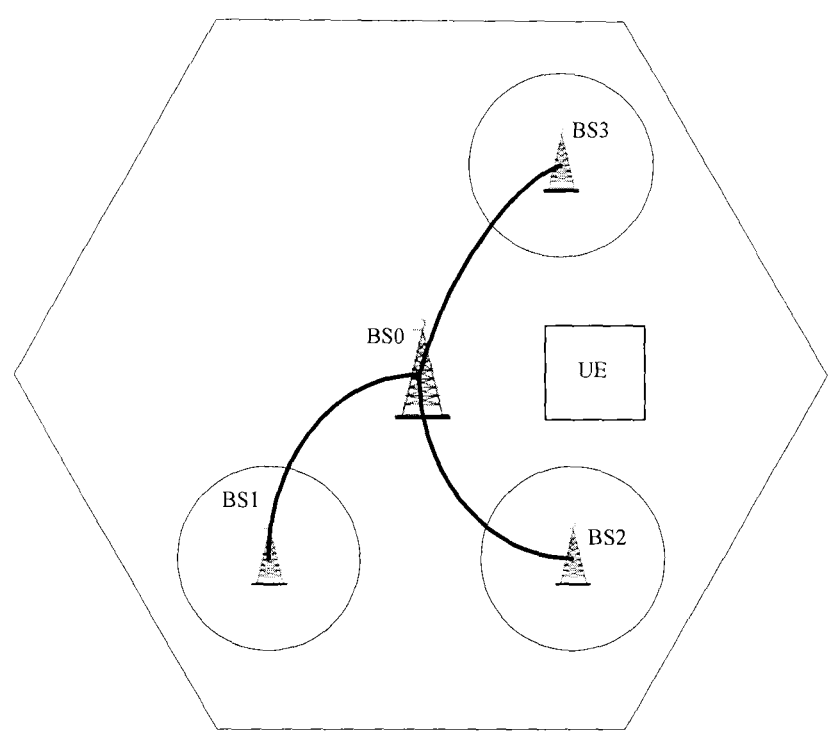
FIG. 7 is a schematic diagram of a network scenario applied to case 3 according to solutions of the embodiments of the disclosure.
Figure 8:
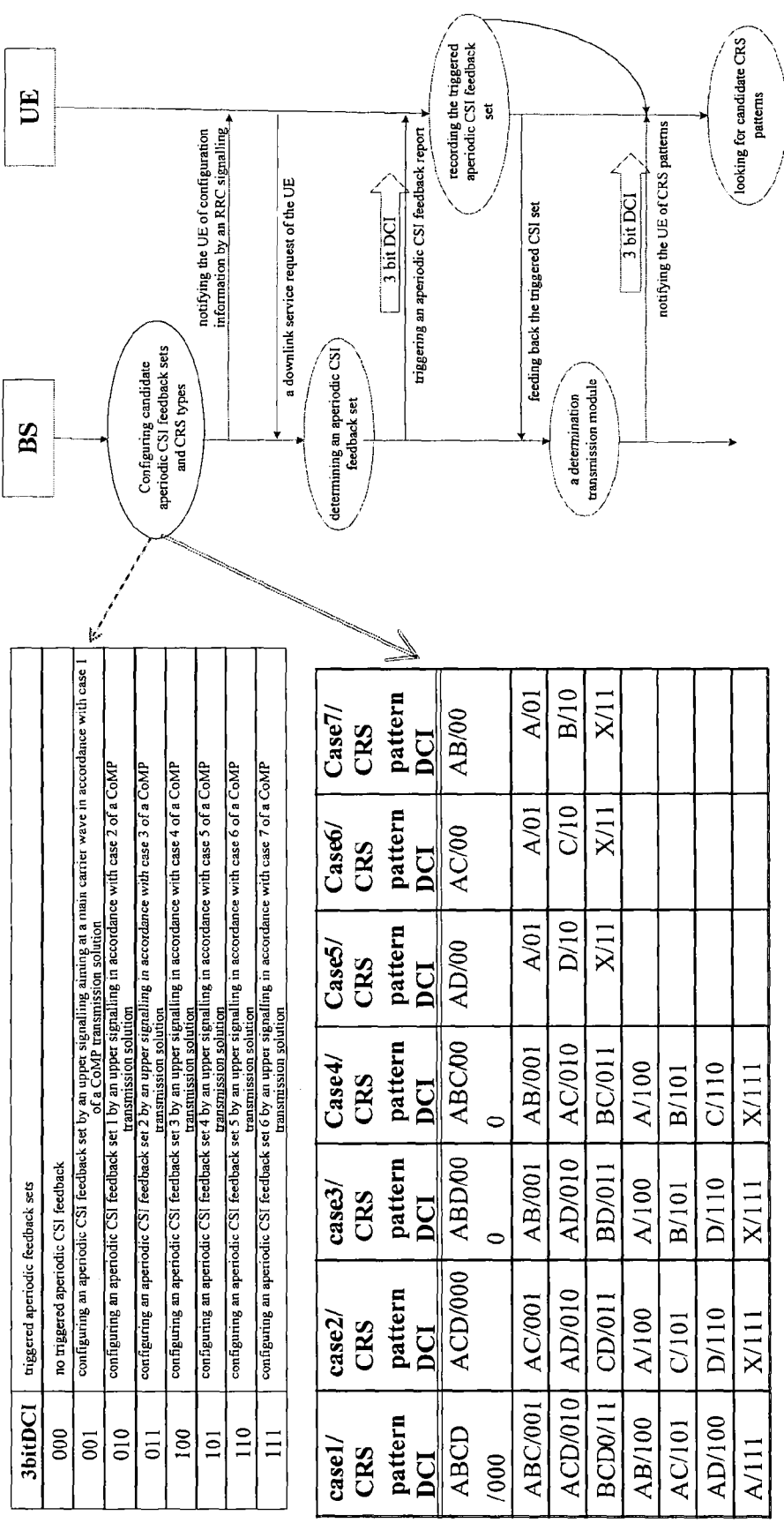
FIG. 8 is a flow chart of signalling of triggering aperiodical CSI feedbacks and looking for CRS pattern configurations applied to case 3 according to solutions of the embodiments of the disclosure.

By taking TR36.819 CoMP scenario 3 for example, as shown in FIG. 7, a CoMP measurement set contains 4 BSs (BS0, BS1, BS2 and BS3, wherein the BS0 is a main cell and the remaining cells are coordinated cells), n is 3, BS0 is eNB, BS1, BS2 and BS3 are low Tx power RRH, and the connection among the BSs is achieved by fibers or other manners. FIG. 8 illustrates a flow chart triggering aperiodic CSI feedbacks and looking for CRS pattern DCI configurations. The steps to be implemented are as follows:

Step 1: classifying all the possible CoMP transmission schemes into the following cases based on whether CoMP transmission points transmit the PDSCHs to the UE:

case 1: BS0, BS1, BS2 and BS3 transmit the PDSCH to the current UE;

case 2: BS1 does not transmit the PDSCH to the UE;

case 3: BS2 does not transmit the PDSCH to the UE;

case 4: BS3 does not transmit the PDSCH to the UE;

case 5: BS1 and BS2 do not transmit the PDSCH to the UE;

case 6: BS1 and BS3 do not transmit the PDSCH to the UE; and case 7: BS2 and BS3 do not transmit the PDSCH to the UE.

Step 2: configuring aperiodic CSI feedbacks in accordance with the different transmission schemes. Configurations of demands of corresponding aperiodic CSI feedbacks are performed in accordance with the classification of the CoMP transmission schemes in Step 1:

TABLE 10

| 3 bit DCI | Triggered Aperiodic Feedback Sets |
|---|---|
| 000 | no triggered aperiodic feedback set |
| 001 | an aperiodic feedback set configured by an upper layer signaling aiming at a primary carrier according to case 1 of the CoMP transmission scheme |
| 010 | an aperiodic feedback set 1 configured by an upper layer signaling according to case 2 of the CoMP transmission scheme |
| 011 | an aperiodic feedback set 2 configured by an upper layer signaling according to case 3 of the CoMP transmission scheme |
| 100 | an aperiodic feedback set 3 configured by an upper layer signaling according to case 4 of the CoMP transmission scheme |
| 101 | an aperiodic feedback set 4 configured by an upper layer signaling according to case 5 of the CoMP transmission scheme |
| 110 | an aperiodic feedback set 5 configured by an upper layer signaling according to case 6 of the CoMP transmission scheme |
| 111 | an aperiodic feedback set 6 configured by an upper layer signaling according to case 7 of the CoMP transmission scheme |

One of the seven cases may be notified to the UE by the first DCI in accordance with the correspondences between the bits and the cases in Table 10. Wherein the correspondences between the bits and the transmission schemes are not limited to the cases in Table 10 and may be modified depending on the actual demands.

Step 3: configuring candidate CRS patterns respectively in accordance with the seven CoMP transmission schemes.

For convenience of the description, the CRS pattern is A, B, C or D if the BS0, BS1, BS2 and BS3 transmit normal subframes, respectively; and when the BS transmits the MBSFN, the CRS pattern is marked as X. All the CRS patterns corresponding to the seven CoMP transmission schemes in Step 1 are shown in Table 11:

TABLE 11

| CoMP Transmission schemes | Possible CRS Patterns |
|---|---|
| Case 1: (BS0, BS1, BS2, BS3) | ABCD, ABC, ACD, ABD, BCD, AB, AC, AD, BC, BD, CD, A, B, C, D, X |
| Case 2: (BS0, BS2, BS3), (BS0, BS2), (BS0, BS3), (BS2, BS3), (BS0), (BS2), (BS3) | ACD, AC, AD, CD, A, C, D, X |
| Case 3: (BS0, BS1, BS3), (BS0, BS1), (BS0, BS3), (BS1, BS3), (BS0), (BS1), (BS3) | ABD, AB, AD, BD, A, B, D, X |
| Case 4: (BS0, BS1, BS2), (BS0, BS1), (BS0, BS2), (BS1, BS2), (BS0), (BS1), (BS2) | ABC, AB, AC, BC, A, B, C, X |
| Case 5: (BS0, BS3), (BS0), (BS3) | AD, A, D, X |
| Case 6: (BS0, BS2), (BS0), (BS2) | AC, A, C, X |
| Case 7: (BS0, BS1), (BS0), (BS1) | AB, A, B, X |

The BS0 is the main cell, so the UE may be informed of MBSFN subframe configuration information of the BS0 through system information. Thus, some CRS patterns in case 1 can be combined (the UE is required to consider the MBSFN subframe configuration information in case 1), for example, $$AB = \begin{cases} AB, \text{ if } BS0 \text{ transmits the normal subframes} \\ B, \text{ if } BS0 \text{ transmits the } MBSFN \text{ subframes} \end{cases}$$

Similarly, the above possible CRS patterns can be simplified, as shown in Table 12:

TABLE 12

| CoMP Transmission schemes | Possible CRS Patterns |
|---|---|
| Case 1: (BS0, BS1, BS2, BS3) | ABCD, ABC, ACD, ABD, AB, AC, AD, A |
| Case 2: (BS0, BS2, BS3), (BS0, BS2), (BS0, BS3), (BS2, BS3), (BS0), (BS2), (BS3) | ACD, AC, AD, CD, A, C, D, X |
| Case 3: (BS0, BS1, BS3), (BS0, BS1), (BS0, BS3), (BS1, BS3), (BS0), (BS1), (BS3) | ABD, AB, AD, BD, A, B, D, X |
| Case 4: (BS0, BS1, BS2), (BS0, BS1), (BS0, BS2), (BS1, BS2), (BS0), (BS1), (BS2) | ABC, AB, AC, BC, A, B, C, X |
| Case 5: (BS0, BS3), (BS0), (BS3) | AD, A, D, X |
| Case 6: (BS0, BS2), (BS0), (BS2) | AC, A, C, X |
| Case 7: (BS0, BS1), (BS0), (BS1) | AB, A, B, X |

It can thus be seen that case 1-4 are represented by 3 bit, respectively, and cases 5-7 are represented by 2 bit, respectively. Accordingly the candidate CRS patterns may be configured as shown in Table 13:

TABLE 13

| case 1/CRS pattern DCI | case 2/CRS pattern DCI | case 3/CRS pattern DCI | Case 4/CRS pattern DCI | Case 5/ CRS pattern DCI | Case 6/ CRS pattern DCI | Case 7/ CRS pattern DCI |
|---|---|---|---|---|---|---|
| ABCD/ 000 | ACD/000 | ABD/000 | ABC/000 | AD/00 | AC/00 | AB/00 |
| ABC/001 | AC/001 | AB/001 | AB/001 | A/01 | A/01 | A/01 |
| ACD/010 | AD/010 | AD/010 | AC/010 | D/10 | C/10 | B/10 |
| BCD0/11 | CD/011 | BD/011 | BC/011 | X/11 | X/11 | X/11 |
| AB/100 | A/100 | A/100 | A/100 | | | |
| AC/101 | C/101 | B/101 | B/101 | | | |
| AD/100 | D/110 | D/110 | C/110 | | | |
| A/111 | X/111 | X/111 | X/111 | | | |

It is noted that the correspondences between the bits and the CRS patterns are not limited to the cases shown in Table 13, and are may be modified depending on the actual demands.

Step 4: notifying by the BSs the UE of the aperiodic CSI feedbacks and the configuration information of the CRS patterns through the RRC signalling (corresponding to the first DCI), as shown in Tables 10 and 13.

Step 5: transmitting a downlink data transmission request to the BSs by the UE, and triggering the aperiodic feedback of the UE by using 3 bit DCI (corresponding to the first DCI) after the BSs receive the request, for example, transmitting 010 to the UE is used to trigger the aperiodic feedback corresponding to case 3.

Step 6: receiving the triggering of the aperiodic CSI by the UE, finding out the aperiodic feedback corresponding to 010 in Table 10, feeding the corresponding aperiodic CSI back to the BSs, and recoding the transmission scheme corresponding to the triggered aperiodic feedback 010, i.e. case 3, for the purpose of looking for the subsequent CRS patterns.

Step 7: receiving by the BSs the aperiodic CSI fed back by the UE, and based on which, determining a specific CoMP transmission scheme. By taking CoMP JT for example, the BS0, BS2 and BS3 transmit the PDSCHs to the UE currently at the same time. If the current BS0 and BS2 transmit the normal subframes and the BS3 transmits MBSFN subframes, the CRS pattern is AC. Refer to Table 13, 3 bit CRS pattern DCI 001 (corresponding to the second DCI) is transmitted to the UE in order for notification of the current CRS pattern.

Step 8: receiving 3 bit CRS pattern DCI by the UE and looking for the corresponding CRS pattern in Table 13 by combining the information of triggering the aperiodic CSI of 3 bit DCI in step 6. Accordingly the CRS pattern should be AC.

It should be understood that FIGS. 3-8 are illustrative of the specific scenarios of the disclosure merely, and the technical solution of the disclosure can be applied to more transmission points (more BSs are contained in the CoMP measurement set) in the actual applications. Depending on the different cases, the number of bits in the first and the second DCI may be increased or decreased; furthermore, the correspondences between the bits in the first DCI or the second DCI and the CoMP transmission schemes or CRS patterns may be adjusted flexibly without limitation to the correspondences shown in the Tables.

According to the embodiments of the disclosure, a method for determining coordinated multiple point (CoMP) parameters is provided.

The method for determining CoMP parameters comprises the following steps:

receiving first downlink control information (DCI) by UE from network to obtain an aperiodic channel status information (CSI) feedback set and a CoMP transmission scheme to be applied to the UE, wherein the COMP transmission scheme includes a plurality of possible combinations of transmission points that transmit physical downlink shared channels (PDSCH) to the UE; and receiving second DCI by the UE to obtain a transmission parameter based on the first DCI.

According to one embodiment of the disclosure, the transmission parameters may be the CRS patterns. Therefore, in the embodiment, the method for determining CoMP parameters may be used for determining the CRS patterns. It should be understood that the transmission parameters may be the CRS patterns and also other parameters, control information and the like associated with a CoMP transmission mode. The description is made with reference to the CRS patterns.

Figure 9:
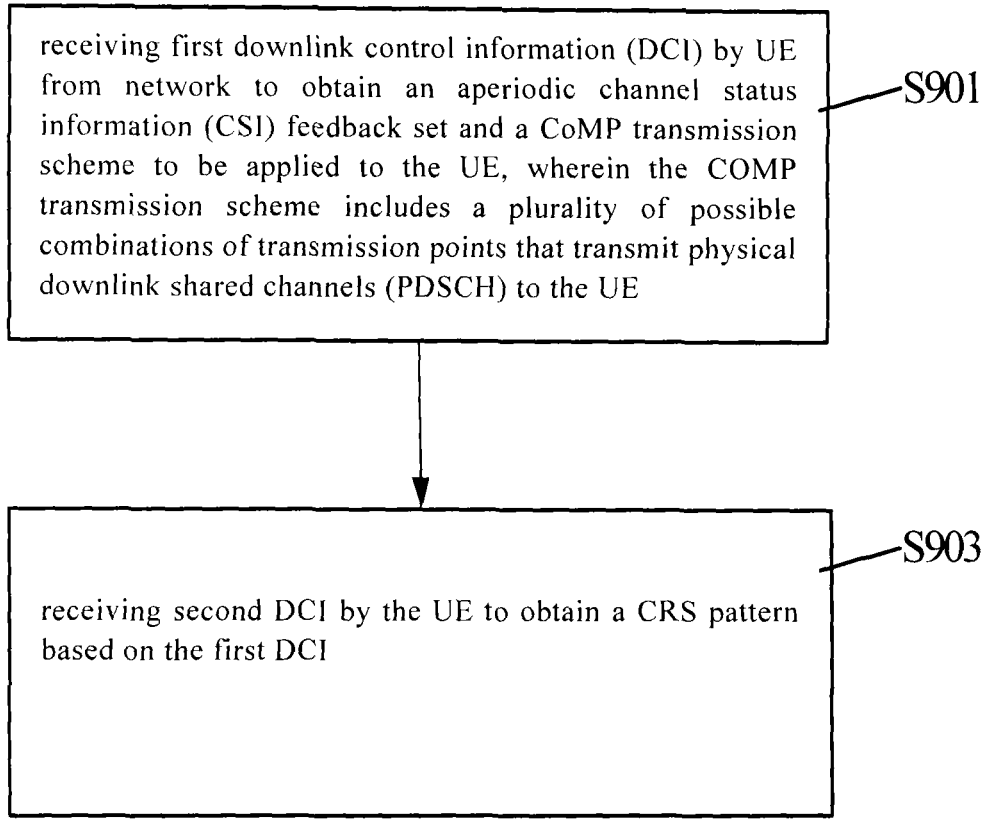
FIG. 9 is a flow chart of a method for determining CRS patterns according to some embodiments of the disclosure.

As shown in FIG. 9, according to the embodiments of determining the CRS patterns, the determination method also comprises the following steps:

step 901: receiving first downlink control information (DCI) by UE from network to obtain an aperiodic channel status information (CSI) feedback set and a CoMP transmission scheme to be applied to the UE, wherein the COMP transmission scheme includes a plurality of possible combinations of transmission points that transmit physical downlink shared channels (PDSCH) to the UE; and step 903: receiving second DCI by the UE to obtain a CRS pattern based on the first DCI.

Wherein, the determination method may further comprises the following steps: receiving a radio resource control (RRC) signalling prior to triggering the aperiodic CSI feedback, and determining the correspondences between the bits in the first DCI and the CoMP transmission schemes as well as the correspondences between the bits in the second DCI and the CRS patterns in each CoMP transmission scheme according to the RRC signalling.

Wherein bits in the first DCI are used for indicating the aperiodic CSI feedback set and the CoMP transmission scheme simultaneously, and bits in the second DCI are used for indicating one of a plurality of candidate CRS patterns in a specific CoMP transmission scheme.

And the method further comprises the step of determining the CoMP transmission scheme in accordance with the bits in the first DCI and correspondences between preconfigured bits and a plurality of CoMp transmission schemes.

And the method further comprises the step of determining CRS patterns in accordance with bits in the second DCI and correspondences between the preconfigured bits and a plurality of possible CRS patterns in the CoMP transmission scheme.

Further, if the number of bits in the first DCI is 2, and the number of the BSs providing the CoMP transmission for the UE is 3, there are three correspondences between the preconfigured bits and the CoMP transmission schemes, including:

The bits in the first DCI are 01, representing that all the transmission points providing the CoMP transmission for the UE transmit the PDSCHs to the UE;

The bits in the first DCI are 10, representing that a first neighbor cell BS in all the transmission points providing the CoMP transmission for the UE does not transmit the PDSCHs to the UE; and The bits in the first DCI are 11, representing that a second neighbor cell BS in all the transmission points providing the CoMP transmission for the UE does not transmit the PDSCHs to the UE.

Furthermore, if the number of bits in the first DCI is 2 and the number of the BSs for providing the CoMP for the UE is 3, the bits in the first DCI represent three CoMP transmission schemes, the method for determining CRS patterns further comprising:

if the bits in the first DCI are 00, determining no triggered aperiodic CSI feedback;

if the bits in the first DCI are 01, determining an asperiodic CSI feedback set configured by an upper layer signaling aiming at a primary carrier, and determining the CoMP transmission scheme adopted by the UE currently as a first CoMP transmission scheme;

if the bits in the first DCI are 10, determining a first aperiodic CSI feedback set configured by the upper layer signaling, and determining the CoMP transmission scheme adopted by the UE currently as a second CoMP transmission scheme; and if the bits in the first DCI are 11, determining a second aperiodic CSI feedback set configured by the upper layer signaling, and determining the CoMP transmission scheme adopted by the UE currently as a third CoMP transmission scheme.

Corresponding to the method for notifying CRS patterns described previously, the method for determining CRS patterns according to the disclosure can be also applied to many scenarios, and hence is not discussed in further detail herein to avoid repetition.

A device for notifying coordinated multiple point (CoMP) transmission parameters, arranged at network, is provided according to the embodiments of the disclosure.

Figure 10:
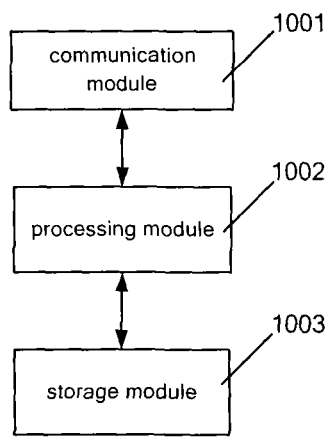
FIG. 10 is a block diagram of a device for notifying CRS patterns according to some embodiments of the disclosure.

FIG. 10 shows the device for notifying CoMP transmission parameters comprising:

A communication module 1001 for transmitting first downlink control information (DCI) to user equipment (UE) to inform the UE an aperiodic channel status information (CSI) feedback set and a CoMP transmission scheme to be applied to the UE, and transmitting second DCI to the UE for notifying a transmission parameters to the UE based on the first DCI, wherein the CoMP transmission includes a plurality of possible combinations of transmission points that transmit PDSCH to the UE.

In one embodiment, the transmission parameters may be the CRS patterns. It should be understood that the transmission parameters may be the CRS patterns and also other parameters, control information and the like associated with a CoMP transmission mode. The description is made with reference to the CRS patterns.

When being used for notifying the CRS patterns, the communication module 1001 is configured for transmitting first downlink control information (DCI) to user equipment (UE) to inform the UE an aperiodic channel status information (CSI) feedback set and a CoMP transmission scheme to be applied to the UE, and transmitting second DCI to the UE for notifying a CRS pattern to the UE based on the first DCI, wherein the CoMP transmission includes a plurality of possible combinations of transmission points that transmit PDSCH to the UE.

Wherein bits in the first DCI are used for indicating the aperiodic CSI feedback set and the CoMP transmission scheme simultaneously, and bits in the second DCI are used for indicating one of a plurality of candidate CRS patterns in a specific CoMP transmission scheme.

As shown in FIG. 10, the device further includes a processing module 1002 for determining a CoMP transmission scheme suitable for the UE, and determining bits to be transmitted in the first DCI in accordance with a determination result of the CoMP transmission scheme and correspondences between preconfigured bits and a plurality of CoMP transmission schemes.

As shown in FIG. 10, the device further includes a storage module 1003 for storing the correspondences between preconfigured bits and a plurality of CoMP transmission schemes.

The processing module 1002 is also configured for determining transmission points for carrying out CoMP transmission in the CoMP transmission scheme in accordance with CSI feedbacks of the UE, determining corresponding CRS patterns in accordance with a current sub-frame transmission situation of each transmission points, and determining bits to be transmitted in the second DCI in accordance with correspondences between preconfigured bits and a plurality of possible CRS patterns in the CoMP transmission scheme.

And the storage module 1003 is also configured for storing the correspondences between preconfigured bits and a plurality of possible CRS patterns in the CoMP transmission scheme.

Wherein the bits in the first DCI represent 3 CoMP transmission schemes if the number of the bits in the first DCI is 2 and the number of the BSs providing the CoMP transmission for the UE is 3, the bits in the first DCI may be used in the following ways:

representing no triggered aperiodic CSI feedback when the bits in the first DCI are configured to be 00;

representing an aperiodic CSI feedback set configured by an upper signaling aiming at a primary carrier in accordance with a first CoMP transmission scheme when the bits in the first DCI are configured to be 01;

representing a first aperiodic CSI feedback set configured by an upper layer signaling in accordance with a second CoMP transmission scheme when the bits in the first DCI are configured to be 10; and representing a second aperiodic CSI feedback set configured by an upper layer signaling in accordance with a third CoMP transmission scheme when the bits in the first DCI are configured to be 11.

In addition the communication module 1001 is further configured for notifying the UE of the correspondences between the bits in the first DCI and the plurality of CoMP transmission schemes and correspondences between the bits in the second DCI and CRS patterns in each CoMP transmission scheme by a radio resource control (RRC) signaling prior to triggering an aperiodic CSI feedback.

A device for determining CoMP transmission parameters, arranged at UE, is provided according to the embodiments of the disclosure.

Figure 11:
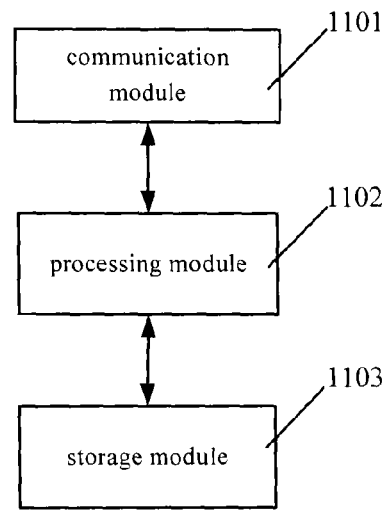
FIG. 11 is a block diagram of a device for determining CRS patterns according to some embodiments of the disclosure.

FIG. 11 shows the device for determining CoMP transmission parameters comprising:

A communication module 1101 for receiving first downlink control information (DCI) from network to obtain an aperiodic channel status information (CSI) feedback set and a CoMP transmission scheme to be applied to the UE, and receiving second DCI to obtain a transmission parameters based on the first DCI, wherein the COMP transmission scheme includes a plurality of possible combinations of transmission points that transmit physical downlink shared channels (PDSCH) to the UE.

In one embodiment of the disclosure, the transmission parameters may be the CRS patterns, and the device for determining CoMP transmission parameters may be used to determine the CRS patters in a CoMP transmission system. It should be understood that the transmission parameters may be the CRS patterns and also other parameters, control information and the like associated with a CoMP transmission mode. The description is made with reference to the CRS patterns.

When being used for determining the CRS patterns, the communication module 1101 is configured for receiving first downlink control information (DCI) from network to obtain an aperiodic channel status information (CSI) feedback set and a CoMP transmission scheme to be applied to the UE, and receiving second DCI to obtain a CRS pattern based on the first DCI, wherein the COMP transmission scheme includes a plurality of possible combinations of transmission points that transmit physical downlink shared channels (PDSCH) to the UE.

Wherein bits in the first DCI are used for indicating the aperiodic CSI feedback set and the CoMP transmission scheme simultaneously, and bits in the second DCI are used for indicating one of a plurality of candidate CRS patterns in a specific CoMP transmission scheme.

As shown in FIG. 11, the device further includes a processing module 1102 for determining the CoMP transmission scheme in accordance with the bits in the first DCI and correspondences between preconfigured bits and a plurality of CoMp transmission schemes.

As shown in FIG. 11, the device further includes a storage module 1103 for storing the correspondences between preconfigured bits and a plurality of CoMP transmission schemes.

The processing module 1102 is further configured for determining CRS patterns in accordance with bits in the second DCI and correspondences between the preconfigured bits and a plurality of possible CRS patterns in the CoMP transmission scheme.

The storage module 1103 is further configured for storing the correspondences between preconfigured bits and a plurality of possible CRS patterns in the CoMP transmission scheme.

Wherein the bits in the first DCI represent 3 CoMP transmission schemes if the number of the bits in the first DCI is 2 and the number of BSs providing CoMP transmission for the UE is 3, the bits in the first DCI may be used in the following ways:

determining no triggered aperiodic CSI feedback if the bits in the first DCI are configured to be 00;

determining an aperiodic CSI feedback set configured by an upper layer signaling aiming at a primary carrier and determining a CoMP transmission scheme adopted by the UE currently as a first CoMP transmission scheme if the bits in the first DCI are configured to be 01;

determining a first aperiodic CSI feedback set configured by an upper layer signaling and determining a CoMP transmission scheme adopted by the UE currently as a second CoMP transmission scheme if the bits in the first DCI are configured to be 10; and determining a second aperiodic CSI feedback set configured by an upper layer signaling and determining a CoMP transmission scheme adopted by the UE currently as a third CoMP transmission scheme if the bits in the first DCI are configured to be 11.

In addition, the communication module 1101 is further configured for receiving a radio resource control (RRC) signaling prior to triggering an aperiodic CSI feedback;

and the processing module 1102 is further configured for determining correspondences between bits in the first DCI and a plurality of CoMP transmission schemes as well as correspondences between bits in the second DCI and CRS patterns in each CoMP transmission scheme in accordance with the RRC signaling.

The notification and determination devices according to the embodiments of the disclosure may be applied to, but not limited to, the scenarios used in the embodiments of the methods. When the notification and determination devices are in operation, the operation of each module is described previously and hence is not discussed in further detail herein to avoid repetition.

A non-transient storage medium having embodied thereon a computer program configured to cause a processor to implement a notification technique for common reference signal (CRS) patterns is provided according to another aspect of the disclosure. The computer program comprises code segments configured to cause a processor to:

transmitting first downlink control information (DCI) to user equipment (UE) to inform the UE an aperiodic channel status information (CSI) feedback set and a CoMP transmission scheme to be applied to the UE, wherein the CoMP transmission includes a plurality of possible combinations of transmission points that transmit PDSCH to the UE; and transmitting second DCI to the UE for notifying a CRS pattern to the UE based on the first DCI.

A non-transient storage medium having embodied thereon a computer program configured to cause a processor to implement a determination technique for common reference signal (CRS) patterns. The computer program comprises code segments configured to cause a processor to:

receiving first downlink control information (DCI) by UE from network to obtain an aperiodic channel status information (CSI) feedback set and a CoMP transmission scheme to be applied to the UE, wherein the COMP transmission scheme includes a plurality of possible combinations of transmission points that transmit physical downlink shared channels (PDSCH) to the UE; and receiving second DCI to obtain a CRS pattern based on the first DCI.

From the foregoing, the first DCI is used to notify the terminal of the specific CoMP transmission scheme by virtue of configuring the correspondences between the bits in the first DCI and the plurality of CoMP transmission schemes so that the bits in the second DCI represent all the possible CRS configurations in the currently-adopted CoMP transmission scheme, thereby exactly notifying the UE of the CRS patterns, supporting all the CoMP transmission schemes and notifications of all the CRS patterns therein, effectively perfecting the notifications of the CRS patterns, saving the signalling overheads, and significantly improving the flexibility; furthermore, the disclosure is achieved without improvement to exiting flows and has good compatibility, and is applicable well although the scenarios are changed.

The basic principles of the disclosure is discussed with respect to the embodiments, however, it is noted that a person skilled in the art should appreciate from the disclosure all or any of the steps or features of the methods and devices of the disclosure and may implement the same in any calculating device (such as a processor, a storage medium, etc.) or calculating device network by hardware, firmware, software or the combination thereof by applying their basic programming skills.

Therefore, the disclosure may be implemented by running a program or one group of programs in any calculating device. The calculating device may be the publicly known device. The invention may be implemented by merely providing a program product containing program codes for realizing the methods or devices. In other words, such program product constitutes the disclosure, and a storage medium in which such program product is stored also constitutes the disclosure. Obviously, the storage medium may be any storage medium which is well known or will be developed in the future.

Figure 12:
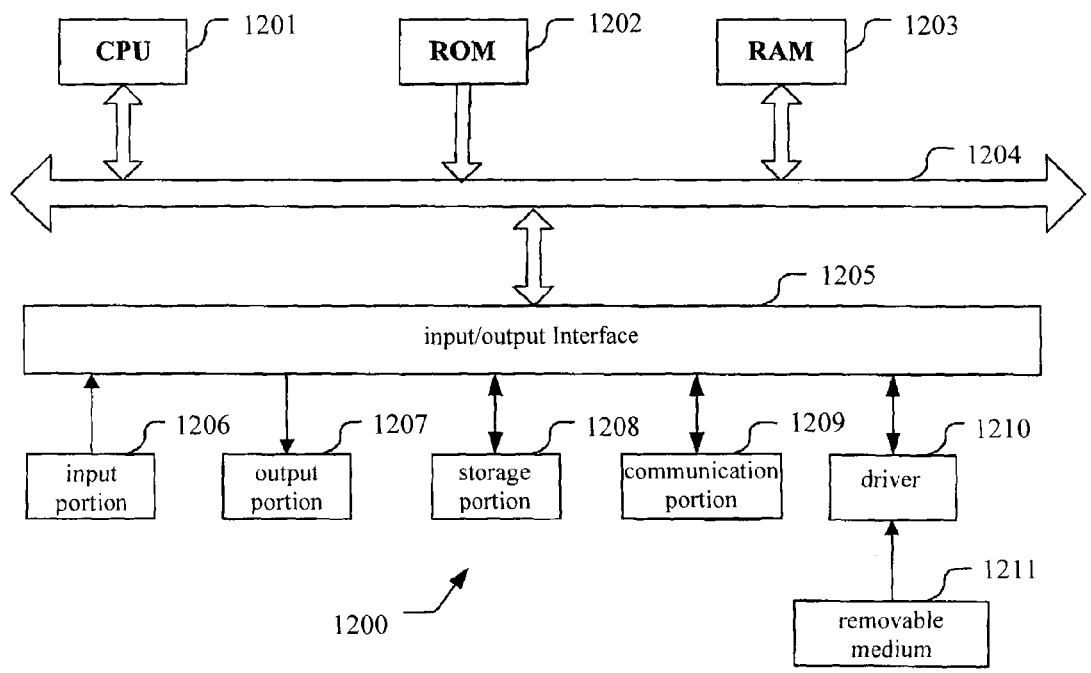
FIG. 12 is an exemplary structure diagram of a computer for realizing the technical solution of the disclosure.

In a circumstance that the embodiments of the disclosure are realized by software and/or firmware, program constituting the software are installed in a computer with a special hardware structure, for example, a common computer 1200 shown in FIG. 12, by the storage medium or network. The computer equipped with the program can execute different functions.

Refer to FIG. 12, a central processing unit (CPU) 1201 executes different operations according to a program stored in a read-only memory (ROM) 1202 or a program loaded in a random access memory (RAM) 1203 from a storage portion 1208. The RAM 1203 also stores data required for the different operations executed by the CPU 1201. The CPU 1201, the ROM 1202 and the RAM 1203 are connected mutually by a bus 1204. An input/output interface 1205 is also connected to the bus 1204.

An input portion 1206 including a keyboard, a mouse and the like, an output portion 1207 including a display (such as a cathode-ray tube (CRT) display, a liquid-crystal display (LCD) and the like) and a loudspeaker, etc., the storage portion 1208 including a hard disk, etc. and a communication portion 1209 including a network interface card such as an LAN card and a modulator-demodulator, etc. are connected to the input/output interface 1205. The communication portion 1209 runs a communication operation by a network such as Internet.

A driver 1210 is connected to the input/output interface 1205 as needed. A removable medium 1211 such as a disc, an optical disc, a magnetic optical disc, a semiconductor memory and the like are installed in the driver 1210 as needed, such that a computer program read from the driver 1210 is installed in the storage portion 1208 as needed.

When the software is used to realize the processing operations, a program constituting the software is installed by the network such as Internet or the storage medium such as the removable medium 1211.

A person skilled in the art should understand that the storage medium includes, but not limited to, the removable medium 1211 storing the program and providing programs for users in separation from the device, as shown in FIG. 12. The removable medium 1211 includes a disc (including a floppy disk (registered trademark)), an optical disc (including a compact disk read only memory (CD-ROM) and a digital video disk (DVD)), a magnetic optical disc (including minidisc (MD) (registered trademark)) and a semiconductor memory. Or, the storage medium may be discs and the like included in the ROM 1202 and the storage portion 1208, wherein the discs stores the programs and are distributed to the users with the devices containing the same.

It is should be noted that the features or steps can be split and/or recombined in the devices and methods of the disclosure. Such splitting and/or recombination are deemed to be equivalents. Moreover, the steps can be performed in time order described naturally, but they are not necessarily required. Some steps can be performed in parallel or independently.

Although the disclosure and advantages thereof have been described in detail, it should be understood that various changes, substitutions and alterations can be made herein without departing from the spirit and scope of the disclosure. Moreover, the terms, such as 'comprise', 'composed of' or other nonexclusive derivatives are used in the invention, such that the process, method, product or device comprises not only a series of factors but also other factors not described definitely, or inherent factors thereof. Without more limitations, the wording 'comprising one . . . ' defines one factor, but other same factors may be comprised in the process, method, product or device.

The invention claimed is:

1. A method for notifying common reference signal (CRS) patterns, used for notifying CRS patterns in a coordinated multiple point (CoMP) transmission system, the method comprising:
    transmitting first downlink control information (DCI) to user equipment (UE) to inform the UE of an aperiodic channel status information (CSI) feedback set and a CoMP transmission scheme to be applied to the UE, wherein the CoMP transmission scheme includes a plurality of possible combinations of transmission points that transmit physical downlink shared channels (PDSCH) to the UE;
    transmitting second DCI to the UE for notifying a CRS pattern to the UE based on the first DCI;
    determining, using processing circuitry, transmission points for carrying out CoMP transmission in the CoMP transmission scheme in accordance with CSI feedbacks of the UE;
    determining, using the processing circuitry, corresponding CRS patterns in accordance with a current sub-frame transmission situation of each of the transmission points; and
    determining, using the processing circuitry, bits to be transmitted in the second DCI in accordance with correspondences between preconfigured bits and a plurality of possible CRS patterns in the CoMP transmission scheme.

2. A method for determining common reference signal (CRS) patterns, used for determining CRS patterns in a coordinated multiple point (CoMP) transmission system, the method comprising:
    receiving first downlink control information (DCI) by UE from network to obtain an aperiodic channel status information (CSI) feedback set and a CoMP transmission scheme to be applied to the UE, wherein the CoMP transmission scheme includes a plurality of possible combinations of transmission points that transmit physical downlink shared channels (PDSCH) to the UE;
    receiving second DCI by the UE to obtain a CRS pattern based on the first DCI, wherein
        the CoMP transmission scheme includes a plurality of possible combinations of transmission points that transmit physical downlink shared channels (PDSCH) to the UE,
        bits in the first DCI are used for indicating the aperiodic CSI feedback set and the CoMP transmission scheme simultaneously, and bits in the second DCI are used for indicating one of a plurality of candidate CRS patterns in a specific CoMP transmission scheme, and
        the bits in the first DCI represent 3 CoMP transmission schemes when the number of the bits in the first DCI is 2 and the number of BSs providing CoMP transmission for the UE is 3; and using, by processing circuitry, the bits in the first DCI in one of the following ways:
    determining no triggered aperiodic CSI feedback when the bits in the first DCI are configured to be 00;
    determining an aperiodic CSI feedback set configured by an upper layer signaling aiming at a primary carrier and determining a CoMP transmission scheme adopted by the UE currently as a first CoMP transmission scheme when the bits in the first DCI are configured to be 01;
    determining a first aperiodic CSI feedback set configured by an upper layer signaling and determining a CoMP transmission scheme adopted by the UE currently as a second CoMP transmission scheme when bits in the first DCI are configured to be 10; and
    determining a second aperiodic CSI feedback set configured by an upper layer signaling and determining a CoMP transmission scheme adopted by the UE currently as a third CoMP transmission scheme when the bits in the first DCI are configured to be 11.

3. A device for notifying common reference signal (CRS) patterns, used for notifying CRS patterns in a coordinated multiple point (CoMP) transmission system, the device including:
a communication circuit configured to:
transmit first downlink control information (DCI) to user equipment (UE) to inform the UE of an aperiodic channel status information (CSI) feedback set and a CoMP transmission scheme to be applied to the UE; and
transmit second DCI to the UE for notifying a CRS pattern to the UE based on the first DCI, the CoMP transmission scheme including a plurality of possible combinations of transmission points that transmit physical downlink shared channels (PDSCH) to the UE; and processing circuitry configured to:
determine transmission points for carrying out CoMP transmission in the CoMP transmission scheme in accordance with CSI feedbacks of the UE;
determine corresponding CRS patterns in accordance with a current sub-frame transmission situation of each transmission points; and
determine bits to be transmitted in the second DCI in accordance with correspondences between preconfigured bits and a plurality of possible CRS patterns in the CoMP transmission scheme.

4. The device according to claim 3, wherein bits in the first DCI are used for indicating the aperiodic CSI feedback set and the CoMP transmission scheme simultaneously, and bits in the second DCI are used for indicating one of a plurality of candidate CRS patterns in a specific CoMP transmission scheme.

5. The device according to claim 3, wherein
the processing circuitry is configured to:
determine a CoMP transmission scheme suitable for the UE; and
determine bits to be transmitted in the first DCI in accordance with a determination result of the CoMP transmission scheme and correspondences between preconfigured bits and a plurality of CoMP transmission schemes.

6. The device according to claim 5, further including:
a memory that stores the correspondences between preconfigured bits and a plurality of CoMP transmission schemes.

7. The device according to claim 3, further including:
a memory that stores the correspondences between preconfigured bits and a plurality of possible CRS patterns in the CoMP transmission scheme.

8. The device according to claim 4, wherein the communication circuit is further configured to notify the UE of the correspondences between the bits in the first DCI and the plurality of CoMP transmission schemes and correspondences between the bits in the second DCI and CRS patterns in each CoMP transmission scheme by a radio resource control (RRC) signaling prior to triggering an aperiodic CSI feedback.

9. A device for notifying common reference signal (CRS) patterns, used for notifying CRS patterns in a coordinated multiple point (CoMP) transmission system, the device including:
a communication circuit configured to:
transmit first downlink control information (DCI) to user equipment (UE) to inform the UE of an aperiodic channel status information (CSI) feedback set and a CoMP transmission scheme to be applied to the UE; and
transmit second DCI to the UE for notifying a CRS pattern to the UE based on the first DCI, wherein
the CoMP transmission scheme includes a plurality of possible combinations of transmission points that transmit physical downlink shared channels (PDSCH) to the UE,
bits in the first DCI are used for indicating the aperiodic CSI feedback set and the CoMP transmission scheme simultaneously, and bits in the second DCI are used for indicating one of a plurality of candidate CRS patterns in a specific CoMP transmission scheme, and
the bits in the first DCI represent 3 CoMP transmission schemes in a case that the number of the bits in the first DCI is 2 and the number of the BSs providing the CoMP transmission for the UE is 3; and
processing circuitry configured to use the bits in the first DCI in one of the following ways:
representing no triggered aperiodic CSI feedback when the bits in the first DCI are configured to be 00;
representing an aperiodic CSI feedback set configured by an upper signaling aiming at a primary carrier in accordance with a first CoMP transmission scheme when the bits in the first DCI are configured to be 01;
representing a first aperiodic CSI feedback set configured by an upper layer signaling in accordance with a second CoMP transmission scheme when the bits in the first DCI are configured to be 10; and
representing a second aperiodic CSI feedback set configured by an upper layer signaling in accordance with a third CoMP transmission scheme when the bits in the first DCI are configured to be 11.

10. A device for determining common reference signal (CRS) patterns, used for determining CRS patterns in a coordinated multiple point (CoMP) transmission system, the device including:
a communication circuit configured to:
receive first downlink control information (DCI) from network to obtain an aperiodic channel status information (CSI) feedback set and a CoMP transmission scheme to be applied to the UE; and
receive second DCI to obtain a CRS pattern based on the first DCI, wherein
the COMP transmission scheme includes a plurality of possible combinations of transmission points that transmit physical downlink shared channels (PDSCH) to the UE,
bits in the first DCI are used for indicating the aperiodic CSI feedback set and the CoMP transmission scheme simultaneously, and bits in the second DCI are used for indicating one of a plurality of candidate CRS patterns in a specific CoMP transmission scheme, and
the bits in the first DCI represent 3 CoMP transmission schemes when the number of the bits in the first DCI is 2 and the number of BSs providing CoMP transmission for the UE is 3; and processing circuitry configured to use the bits in the first DCI in one of the following ways:
determining no triggered aperiodic CSI feedback when the bits in the first DCI are configured to be 00;
determining an aperiodic CSI feedback set configured by an upper layer signaling aiming at a primary carrier and determining a CoMP transmission scheme adopted by the UE currently as a first CoMP transmission scheme when the bits in the first DCI are configured to be 01;

determining a first aperiodic CSI feedback set configured by an upper layer signaling and determining a CoMP transmission scheme adopted by the UE currently as a second CoMP transmission scheme when the bits in the first DCI are configured to be 10; and determining a second aperiodic CSI feedback set configured by an upper layer signaling and determining a CoMP transmission scheme adopted by the UE currently as a third CoMP transmission scheme when the bits in the first DCI are configured to be 11.

11. The device according to claim 10,
wherein the processing circuitry is configured to determine the CoMP transmission scheme in accordance with the bits in the first DCI and correspondences between preconfigured bits and a plurality of CoMp transmission schemes.

12. The device according to claim 11, further including:
a memory that stores the correspondences between preconfigured bits and a plurality of CoMP transmission schemes.

13. The device according to claim 10,
wherein the processing circuitry is configured to determine CRS patterns in accordance with bits in the second DCI and correspondences between the preconfigured bits and a plurality of possible CRS patterns in the CoMP transmission scheme.

14. The device according to claim 13, further including:
a memory that stores the correspondences between preconfigured bits and a plurality of possible CRS patterns in the CoMP transmission scheme.

15. The device according to claim 10, wherein
the communication circuit is further configured to receive a radio resource control (RRC) signaling prior to triggering an aperiodic CSI feedback, and the processing circuitry is configured to determine correspondences between bits in the first DCI and a plurality of CoMP transmission schemes as well as correspondences between bits in the second DCI and CRS patterns in each CoMP transmission scheme in accordance with the RRC signaling.

* * * * *